(12) United States Patent
Sawyer et al.

(10) Patent No.: US 6,466,986 B1
(45) Date of Patent: Oct. 15, 2002

(54) METHOD AND APPARATUS FOR PROVIDING DYNAMIC HOST CONFIGURATION PROTOCOL (DHCP) TAGGING

(75) Inventors: Wilson E. Sawyer, East Hampstead, NH (US); Gerry White, Dunstable; Patricia A. Hansen, Reading, both of MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/475,388

(22) Filed: Dec. 30, 1999

(51) Int. Cl.[7] ............................................. G06F 15/173
(52) U.S. Cl. ...................................................... 709/245
(58) Field of Search ................................. 709/245, 230, 709/227, 223, 217

(56) References Cited

U.S. PATENT DOCUMENTS

| | | | |
|---|---|---|---|
| 5,884,024 A | | 3/1999 | Lim et al. |
| 5,987,524 A | * | 11/1999 | Yoshida et al. ............. 709/245 |
| 6,070,187 A | * | 5/2000 | Subramaniam et al. ...... 709/220 |
| 6,145,126 A | * | 11/2000 | Matsukura et al. ........... 717/11 |
| 6,240,464 B1 | * | 5/2001 | Fijolek et al. ............... 709/250 |

FOREIGN PATENT DOCUMENTS

JP 08186569 7/1996

OTHER PUBLICATIONS

Droms, R., "Automated Configuration of TCP/IP with DHCP"; IEEE Internet Computing, IEEE Service Center, Piscataway, NJ., vol. 3, No. 4, 1999, pp. 45–53, XP000874503; ISSN: 1089–7801.

Wilder, F., "A Guide to the TCP/IP protocol suite," Guide to the TCP/IP Protocol Suite, XX,XX 1998, pp. 194–208, XP002139388.

* cited by examiner

Primary Examiner—David Y. Eng
(74) Attorney, Agent, or Firm—Blakely Sokoloff Taylor & Zafman LLP

(57) ABSTRACT

A method, apparatus, and system for providing dynamic host configuration protocol (DHCP) tagging for employing a DHCP server as a non-volatile repository. In one embodiment, the method includes tagging one or more messages from a client computer to the DHCP server with a media access control (MAC) address of a cable modem that is attached to the client computer for storing the MAC address as part of a lease record in the DHCP server. The method further includes receiving a request for the MAC address of the cable modem based on the Internet protocol (IP) address of the client computer from a remote device for transmitting packets to the client computer, obtaining the MAC address of the cable modem corresponding to the IP address of the client computer from the DHCP server, and transmitting the MAC address to the remote device. Consequently, the client computer's traffic through the remote device is directed to the client computer's cable modem.

24 Claims, 5 Drawing Sheets

METHOD AND APPARATUS FOR PROVIDING DYNAMIC HOST CONFIGURATION PROTOCOL (DHCP) TAGGING

BACKGROUND OF THE INVENTION

1. Field of the Invention

The present invention relates generally to the field of computer networks, and specifically, to network forwarding using Dynamic Host Configuration Protocol (DHCP) tagging.

2. Background Information

The Dynamic Host Configuration Protocol (DHCP), published by the Internet Engineering Task Force (IETF) as Request for Comment (RFC) 2131 in March 1997 [hereinafter referred to as "the DHCP specification"], was created to facilitate automatic assignment/leasing of Internet Protocol (IP) addresses to clients when such clients log on to TCP/IP networks. The contents of the DHCP specification are fully incorporated herein by reference. A DHCP server centrally manages the assignment and reassignment of unused IP addresses.

In a subscriber network system such as a cable modem system, IP addresses are assigned by the DHCP server to subscribers via a shared physical medium. The cable modems used by subscribers also include a media access control (MAC) address. To send packets to a subscriber from a web server, the IP address of the subscriber must be translated into a MAC address. This is typically done using an Address Resolution Protocol (ARP), as defined in request for comment (RFC) 826, entitled "An Ethernet Address Resolution Protocol", Published in November 1982, where an ARP request is broadcasted for the unknown address. However, ARP requests introduce the possibility of spoofing (hacking).

SUMMARY OF THE INVENTION

The present invention comprises a method for a device in a system including a server and one or more client computers. In one embodiment, the method includes tagging one or more messages from a client computer to the server with a media access control (MAC) address of a cable modem that is attached to the client computer for storing the MAC address as part of a lease record in the server. The method further includes receiving a request for the MAC address of the cable modem based on the Internet protocol (IP) address of the client computer from a remote device for transmitting packets to the client computer, obtaining the MAC address of the cable modem corresponding to the IP address of the client computer from the server, and transmitting the MAC address to the remote device.

Other embodiments are described and claimed herein.

DETAILED DESCRIPTION

The present invention comprises a method and apparatus for network forwarding data packets using Dynamic Host Configuration Protocol (DHCP) tagging.

As discussed herein, a "computer system" is a product including circuitry capable of processing data. The computer system may include, but is not limited or restricted to, a conventional computer (e.g., laptop, desktop, palmtop, server, mainframe, etc.), hard copy equipment (e.g., printer, plotter, scanner, fax machine, etc.), wireless communication equipment, and the like. Unless otherwise specified, a "packet" is broadly defined as a package of information including data, messages, commands, and the like. However, the present invention applies to transmission of cells and other packaged data formats.

Figure 1:
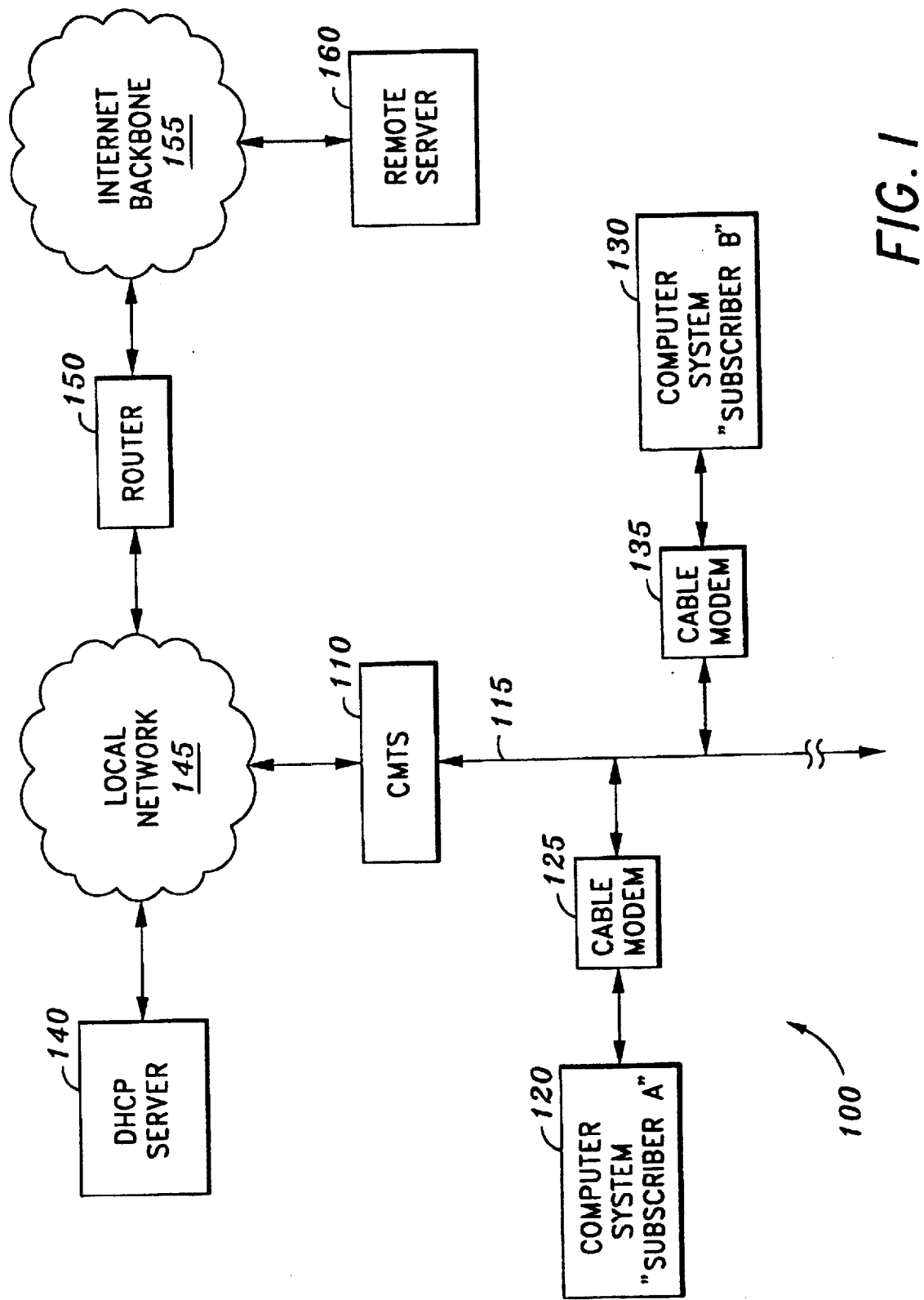
FIG. 1 shows a block diagram of an exemplary subscriber network system that utilizes a DHCP server.

FIG. 1 shows an exemplary subscriber network system 100 that utilizes a DHCP server. In this exemplary system 100, a Cable Modem Termination System (CMTS) 110 is installed at a cable head-end (not shown) and provides data service to subscribers who are attached to an HFC cable plant 115. The cable operator via the CMTS 110 acts as an Internet Service Provider (ISP) for the attached subscribers. Subscriber-A 120 and subscriber-B 130 are coupled to the shared cable plant 115 by way of cable modems 125 and 135, respectively, in addition to other subscribers (not shown). The CMTS 110 is coupled to a DHCP server 140 via a local network 145. The CMTS 110 accesses the Internet backbone 155 and a remote server 160 coupled thereto through a router 150.

To be able to access the Internet backbone 155, subscriber-A 120 must obtain an IP address. Consequently, subscriber-A 120, using DHCP, seeks to acquire an IP address from the DHCP server 140. The CMTS 110, by virtue of being positioned between the DHCP server 140 and subscribers on the cable plant 115, listens to the DHCP exchange between the subscriber-A 120 and the DHCP server 140 (referred to as "DHCP gleaning"). Through DHCP gleaning, the CMTS 110 learns that the IP address for subscriber-A 120 is behind Subscriber-A 120's cable modem 125. The CMTS 110 knows this because subscriber-A 120's cable modem 125 provides its identity when transmitting information upstream to the CMTS 110 (e.g., Service Identifier, for DOCSIS cable modems).

Thereafter, subscriber-A 120 logs onto the remote server 160 using an application such as telnet or a web browser. The remote server 160 replies to the IP address of subscriber-A 120 and sends back IP packets. The replies from the remote server 160 are intercepted by router 150 which must translate the IP address into a media access control (MAC) address. To match an IP address with a MAC address, the router 150 issues an ARP request (or ARPing) for subscriber-A 120. The CMTS 110 either answers directly with information it has learned during DHCP gleaning and stored in its forwarding table, or broadcasts the ARP request over the cable plant 115, and waits for a reply. In either case, the reply subsequently reaches the router 150, which then forwards the IP packet through the CMTS 110 to Subscriber-A 120. The CMTS 110 learns the IP address of subscriber-A 120 through ARP and caches the address locally.

In this system, the CMTS 110 does not have non-volatile memory. This is because it is more efficient and convenient for the DHCP server 140 to be the only source of the IP/MAC addresses. Therefore, if the CMTS 110 crashes, resets, or otherwise loses its cache information (e.g., during a scheduled maintenance), the cached addresses are lost. The CMTS 110 rebuilds its forwarding table on the fly through DHCP gleaning or by ARPing for the unknown IP address. Eventually, the router 150 will age out its ARP cache, losing the IP address of subscriber-A 120. The router 150, on subsequent IP packet exchanges, again issues an ARP request to obtain subscriber-A 120's IP address. The CMTS 110 (if reset) no longer has information about this IP address, and thus propagates the ARP request over the cable plant 115. A hacker, such as subscribers 130, behind cable modem 135 hears the ARP request, and transmits a reply, supplying its own cable modem identity and its own MAC address (subscriber-A 120 may also reply, unless disabled by hacker 130). The CMTS 110 updates its own cache with the IP address of the hacker 130, and forwards the reply to router 150. Consequently, subscriber-A 120's traffic through router 150 has now been redirected to hacker 130, who, in essence, has stolen subscriber-A 120's identity. To prevent hacking, DHCP tagging is employed as hereinafter described.

Figure 2:
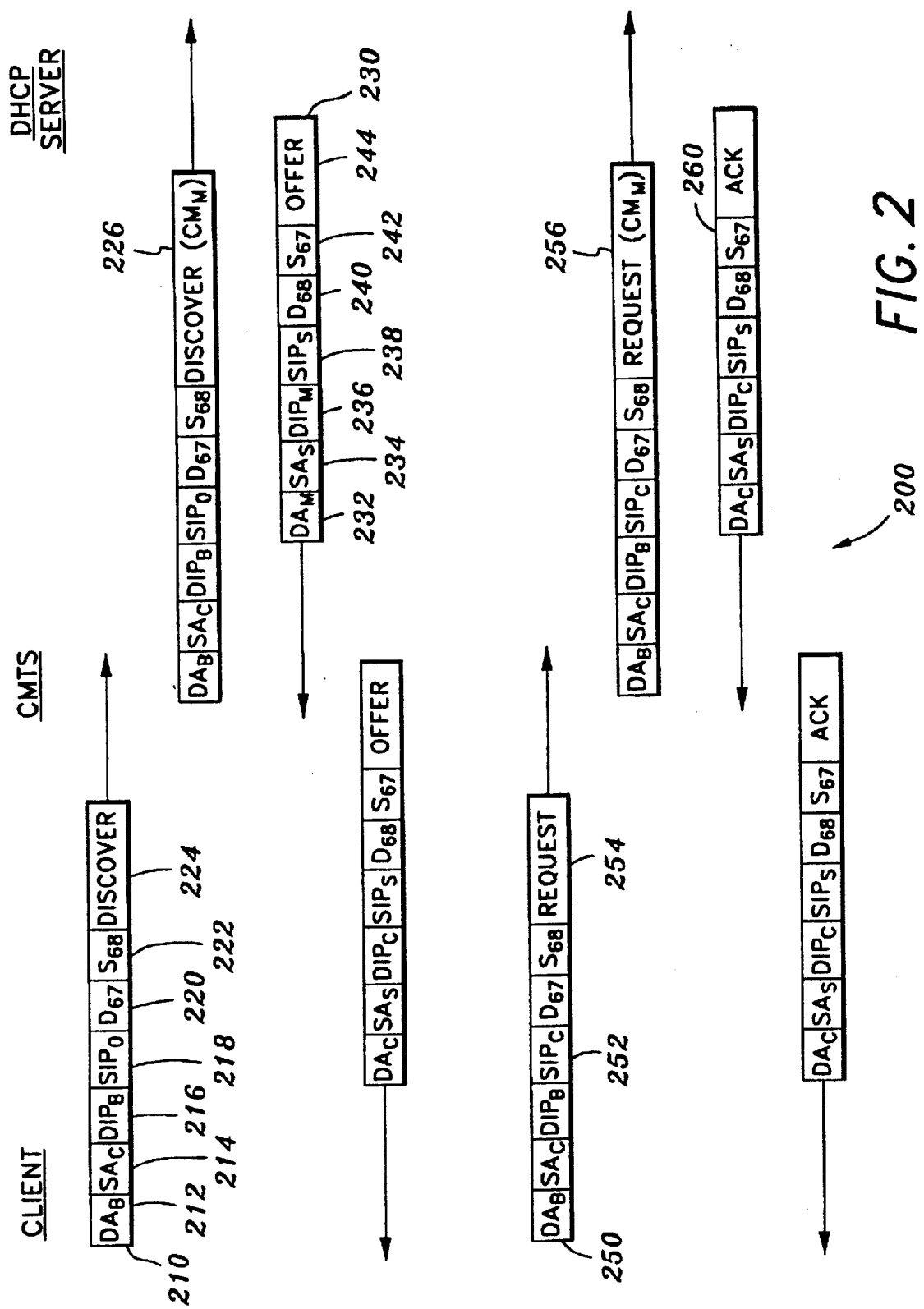
FIG. 2 shows a message flow diagram of packet exchanges between a client subscriber and the DHCP server through the CMTS employing DHCP tagging, according to one embodiment of the present invention.

FIG. 2 shows a message flow diagram 200 of packet exchanges between a client and the DHCP server through the CMTS employing DHCP tagging, according to one embodiment of the present invention. A client refers to any subscriber (e.g., subscriber-A 120) that is coupled to the cable plant 115 of FIG. 1.

Figure 4:
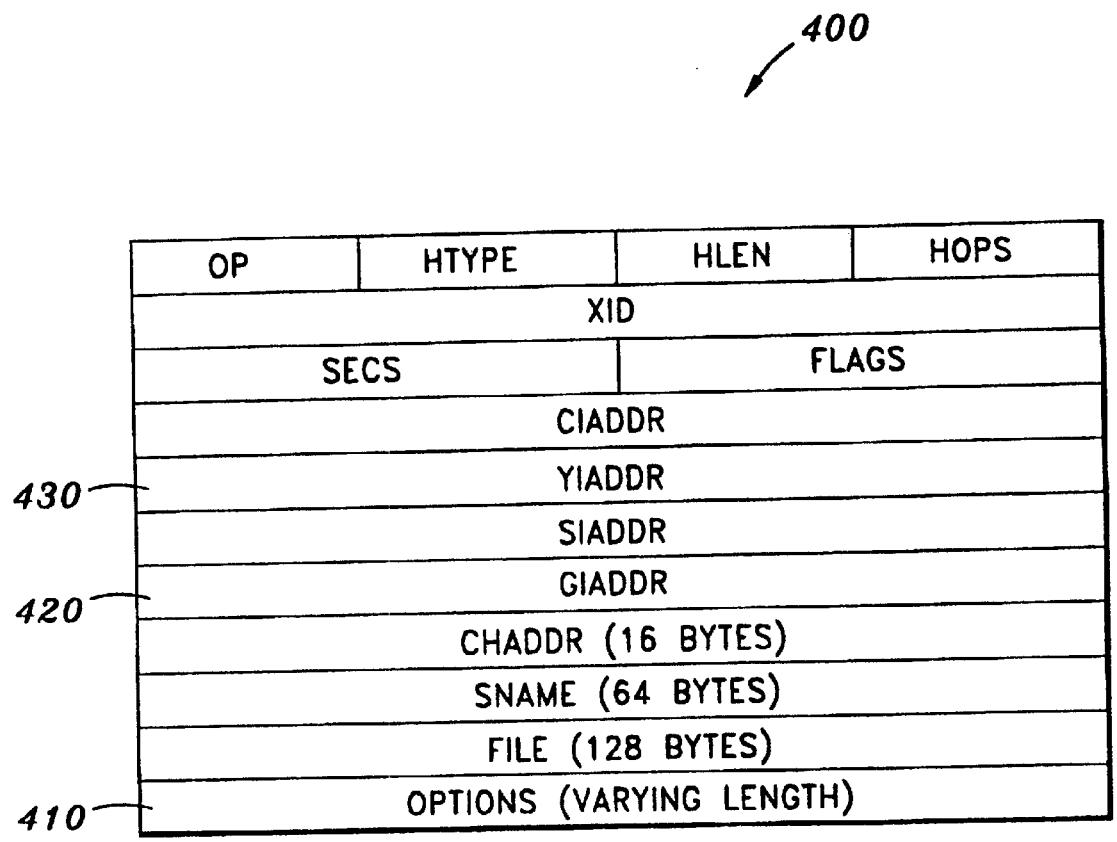
FIG. 4 shows the format of a DHCP message, as defined in the DHCP specification.

Referring to FIG. 2, the exchange of packets is initiated by the client for leasing an Internet Protocol (IP) address for a specified time from the DHCP server. Consequently, the client broadcasts a DISCOVER packet 210 on the cable plant 115 (FIG. 1) to locate available servers. The DISCOVER packet 210 includes fields 212–224. Field 212 defines the broadcast media access control (MAC) address ($DA_B$) used as the destination address (e.g., FF-FF-FF-FF-FF-FF). Field 214 defines the client MAC address ($SA_C$) used as a source. Fields 212 and 214 are used at the MAC layer in accordance to the Open Systems Interconnection (OSI) Reference Model. Field 216 ($DIP_B$) defines the broadcast IP address used as a destination (e.g., 255.255.255.255). Field 218 ($DIP_0$) defines the NULL IP address used as a source (e.g., 0.0.0.0) indicating that the client has not yet been assigned an IP address. Fields 216 and 218 are used at the network layer. Field 220 ($D_{67}$) defines the User Datagram Protocol (UDP) destination port of the DHCP server. Field 222 ($S_{68}$) defines the UDP source port of the client. Fields 220 and 222 are used at the transport layer. Field 224 defines the DHCP DISCOVER message. The general format of DHCP messages, as defined in the DHCP specification, is shown in FIG. 4. In one embodiment, the DHCP DISCOVER message 224 is defined in the options field 410.

Continuing to refer to FIG. 2, the CMTS 110 (FIG. 1) intercepts the broadcast message 210. The CMTS 110 interrogates the packet 210 and detects that the message in field 224 is a DISCOVER message, e.g., by reading the options field 410. The CMTS creates an entry in a forwarding table, places the $SA_C$ field in the entry, and marks the entry as provisional. Typically, only DHCP packets are forwarded to a provisional address, though a provisional entry in the forwarding table times out quickly. The CMTS also modifies the DISCOVER message 224, tagging the MAC address (referred to as $CM_M$) of the cable modem that is coupled between the client and the cable plant 115 (e.g., cable modem 125 coupled to subscriber-A 120). In the case of cable modems that conform to the Data-Over-Cable Service Interface Specifications (DOCSIS) Radio Frequency Interface Specification, SP-RFIv1.1-I03-991105, Released Nov. 5, 1999, the cable modem MAC address is obtained from the Service Identifier field. In particular, when the cable modem logically attaches to the CMTS (referred to as DOCSIS registration), the CMTS assigns one or more "Service IDs" to the cable modem. The "Service ID" serves two purposes, namely, it is a means by which the CMTS grants time-division-multiplexed (TDM) transmission opportunities to each cable modem, and it is included in the packet header and serves as the security association (encryption key lookup) identifier when DOCSIS "Baseline Privacy" encryption is used. Consequently, the CMTS can either TDM information (the timeslots that the packet arrives in) or the baseline privacy header to find the "Service ID". The CMTS can then use the "Service ID" to index to a particular modem's registration information including its MAC address. In one embodiment, the cable modem MAC address ($CM_M$) is tagged to the options field 410. In another embodiment, $CM_M$ is tagged to the GIADDR field 420. The CMTS then forwards the DISCOVER packet with the modified DISCOVER message 226 to the DHCP server.

The DHCP server assigns an IP address to the client, creates a lease record in a table, and marks the record as provisional. The DHCP server then sends an OFFER packet 230 back to the requesting client. The OFFER packet 230 includes fields 232–244. Field 232 defines the CMTS's MAC address ($DA_M$) used as a destination, while field 234 defines the DHCP's MAC address ($SA_S$) used as a source address. Field 236 defines the CMTS's IP address ($DIP_M$), while field 238 defines the DHCP's IP address ($DIP_S$). Field 240 defines the UDP destination port ($D_{68}$) for the client, while field 242 defines the UDP source port ($S_{67}$) of the DHCP server. The OFFER packet 230 further includes field 244 which includes an OFFER message. The OFFER message 244 includes the offered IP address in the YIADDR field 430, and other configuration parameters such as lease time in the options field 410.

The CMTS receives the OFFER packet 230 from the DHCP server, and forwards the packet to the client. The client then responds with broadcasting a REQUEST packet 250. The fields in the request packet 250 are similar to the fields in the DISCOVER packet 210 with the exception of fields 252 and 254. Field 252 defines the client's IP address ($SIP_C$) used as a source address, and field 254 defines the REQUEST message requesting offered parameters from the DHCP server. The REQUEST message also includes the server identifier option SIADDR 440, which indicates the DHCP server that the client has selected. In an environment with more than DHCP server, the receiving servers not selected by the REQUEST message use the message as notification that the client has declined that server's OFFER message.

The CMTS intercepts the REQUEST packet 250, and optionally tags the cable modem's MAC address ($CM_M$) to the REQUEST message, as shown by 256. The CMTS then forwards the REQUEST packet 250 to the DHCP server. As a result, the DHCP server confirms the lease record. The DHCP server also sends an ACK packet 260 confirming the configuration parameters for the requesting client. The CMTS forwards the ACK packet 260 to the client via the CMTS.

Figure 3:
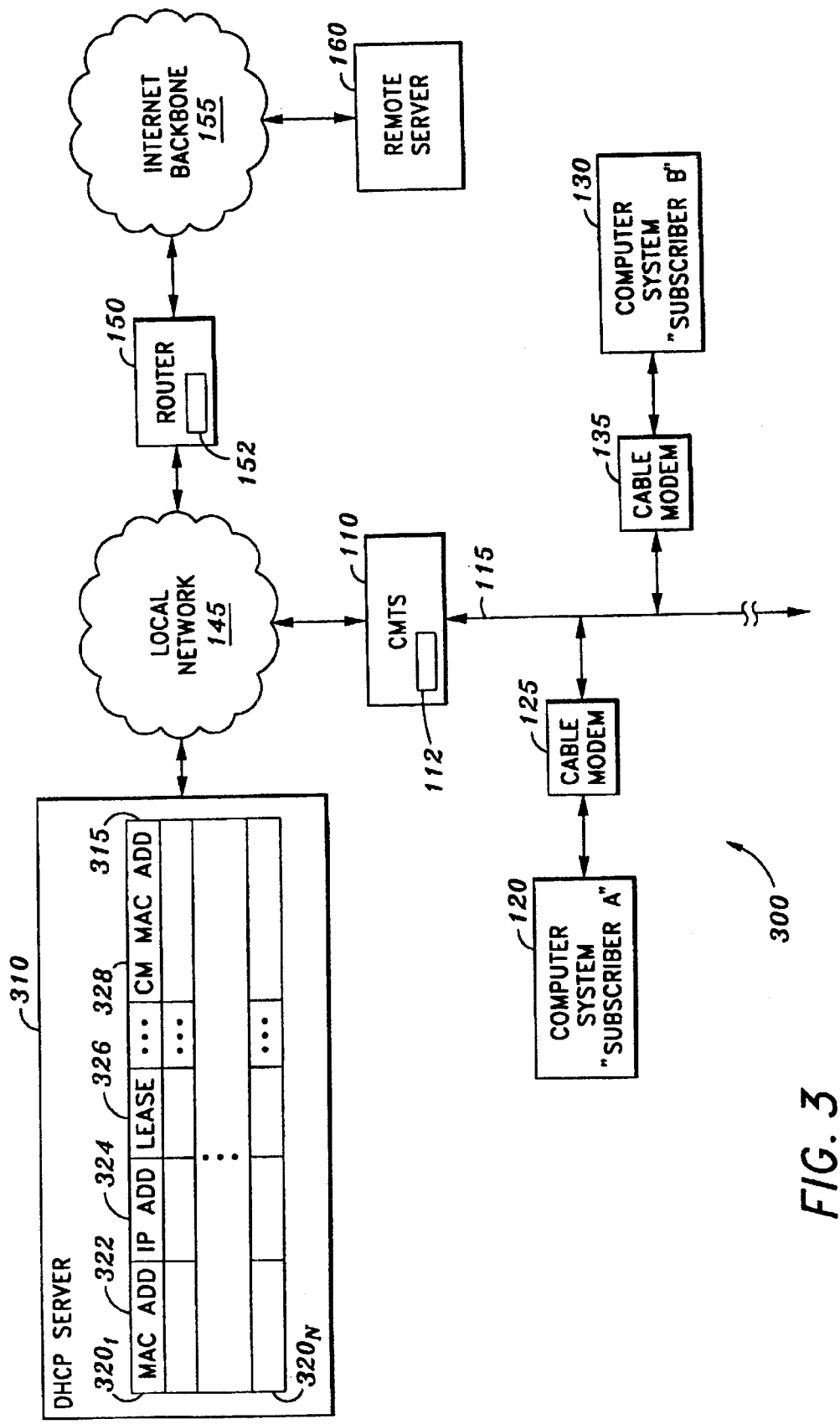
FIG. 3 illustrates a block diagram of a subscriber network system implementing an embodiment of the present invention.

FIG. 3 illustrates a block diagram of a subscriber network system 300 after packet exchanges between a client and the DHCP server through the CMTS employing DHCP tagging, as described in the exemplary flow diagram of FIG. 2. As shown in FIG. 3, like components are labeled with the same number as those in FIG. 1. In the subscriber network system 300, the DHCP server 310 and the CMTS 110 include any type of computer system that has a central processing unit (e.g., microprocessor), memory, input/output ports, and the like, for receiving and transmitting information over communication ports, and processing and caching such data.

The DHCP server 310 maintains a lease record table 315 in memory identifying subscribers in the system 300. The lease record table 315 includes a plurality of entries $320_1$–$320_N$ (where "N" is a positive whole number) each having a plurality of fields. Each entry 320 includes, among other fields, a media access control address ("MAC ADD") field 322 specifying the MAC address of the network card of the client computer system (e.g., MAC address of computer system 120), an Internet protocol address field ("IP ADD") field 324 specifying the IP address assigned to the client, and a lease field 326 specifying the lease period for the assigned IP address. Each entry 320 further includes a cable modem MAC address ("CM MAC ADD") field 328, which is added to the entry in accordance to the teachings of the present invention. The CM MAC ADD field 328 is "tagged" to messages passed from a client-subscriber to the DHCP server 310 by the CMTS 110 when the client-subscriber is negotiating for a lease of an IP address. The DHCP server 310 then adds the CM MAC ADD field 328 as part of a new entry created in table 315.

Figure 5:
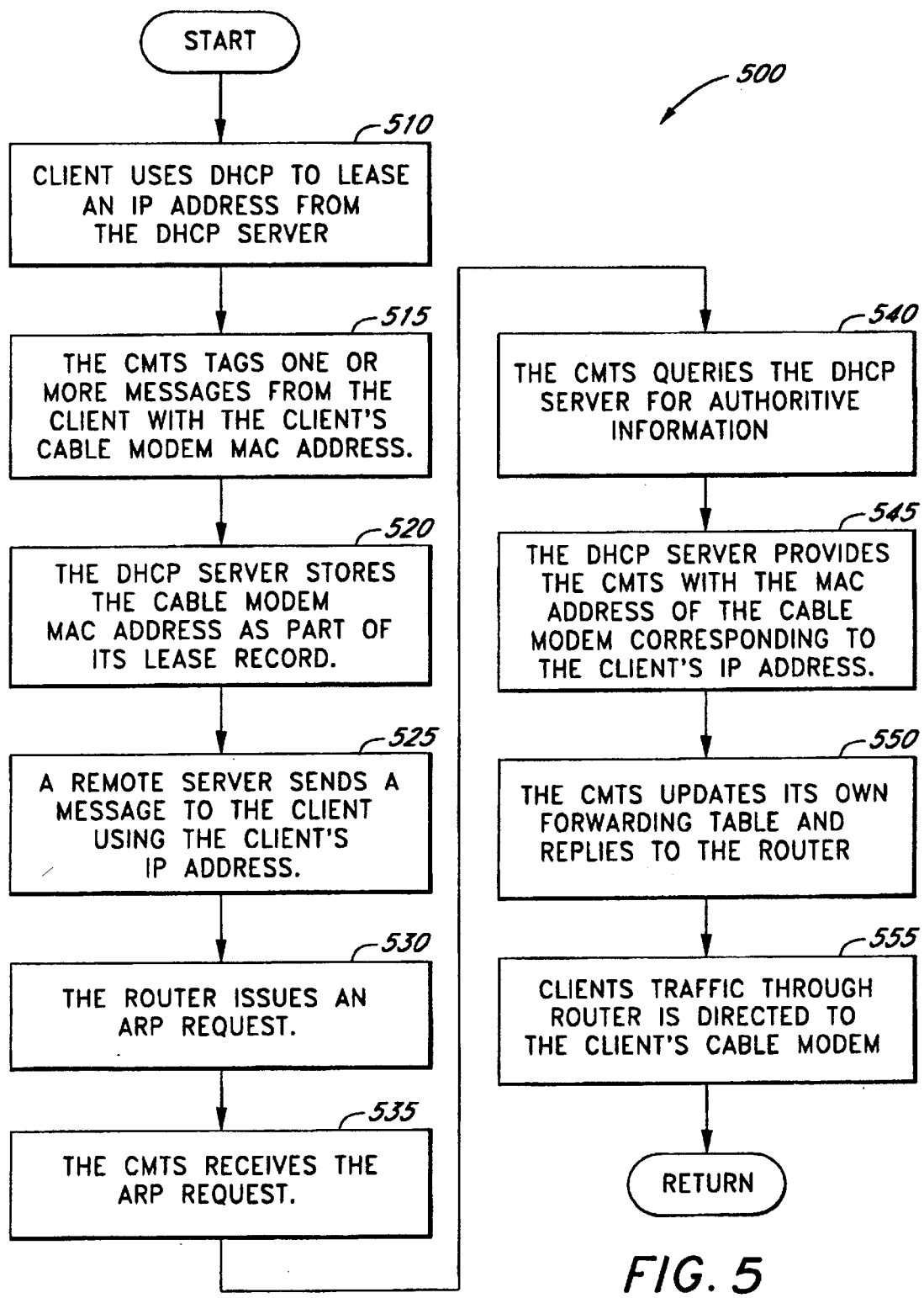
FIG. 5 shows a flow diagram of a method for implementing the present invention.

FIG. 5 shows a flow diagram of a method 500 for implementing the present invention. Referring to FIGS. 3 and 5, the method 500 commences at block 510 where a client such as subscriber-A 120 uses DHCP to lease an IF address from the DHCP server 310. At block 515, the CMTS listens to exchanges between the client and the DHCP server, and "tags" one or more messages from the client to the DHCP server with the MAC address of the cable modem that is attached to the client (e.g., cable modem 125). This information is obtained by the CMTS from the Service Identifier field, as defined in DOCSIS. At block 520, the DHCP server stores this At block 525, the remote server 160 sends one or more packets to the client using the client's IP address. The packets are received by the router 150. On an initial IF packet exchange or on subsequent IF packet exchanges where the cable modem's MAC address in the router's forwarding table 152 has aged out, the router 150 issues an ARP request for the MAC address of the cable modem attached to the client (block 530). At block 535, the CMTS receives the ARP request and checks its forwarding table 112 for the MAC address of the cable modem attached to the client. If the CMTS's forwarding table 112 has been cleared (e.g., CMTS has crashed) or otherwise reset, the CMTS queries the DHCP server for such information (block 540).

The DHCP server 310 locates the MAC address of the cable modem in the CM MAC ADD field from its lease record table 315, and forwards such information to the CMTS (block 545). At block 550, the CMTS then updates its own forwarding table 112 and replies to the router 150. The router then uses the MAC address of the cable modem to send packets to the client. Thus, the client's traffic through the router is directed to the client's cable modem (block 555). Consequently, the present invention eliminates the possibility of spoofing.

The present invention may be embodied in one of several forms including a method, apparatus, system, program product in a computer processor readable medium, and data signal embodied in a carrier wave. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for message tagging in a system including a server and one or more client computers, comprising:

tagging one or more messages from a client computer to the server with a media access control (MAC) address of a cable modem that is attached to the client computer for storing the MAC address as part of a lease record in the server;

receiving a request for the MAC address of the cable modem based on the Internet protocol (IP) address of the client computer from a remote device for transmitting packets to the client computer;

obtaining the MAC address of the cable modem corresponding to the IP address of the client computer from the server; and transmitting the MAC address to the remote device.

2. The method of claim 1 wherein tagging one or more messages comprises appending the MAC address of a cable modem that is attached to the client computer to dynamic host configuration protocol (DHCP) messages transmitted from the client computer to the server.

3. The method of claim 2 wherein the one or more DHCP messages include one or more of the following: a discover packet and a request packet.

4. The method of claim 1 wherein prior to tagging one or more messages, the method comprises:

receiving one or more messages from a client computer;

determining the MAC address of the cable modem that is coupled to the client computer responsive to receiving the one or more messages;

appending the MAC address of the cable modem to at least one of the one or more messages;

transmitting the one or more messages to the server.

5. The method of claim 4 wherein determining the MAC address of the cable modem comprises one of the following: determining the time slot that a message is received from the client computer and interrogating a header of the one or more messages.

6. The method of claim 1 wherein the forwarding table of the CMTS fails to contain the MAC address upon being cleared or otherwise reset.

7. The method of claim 1 wherein the server comprises a dynamic host configuration protocol (DHCP) server.

8. The method of claim 1 wherein the remote device comprises a router.

9. A cable modem termination system (CMTS) having a computer usable medium having computer readable program code embodied therein, comprising:

computer readable program code to append to at least one of one or more messages from a client computer to a dynamic host configuration protocol (DHCP) server with a media access control (MAC) address of a cable modem that is attached to the client computer for storing the MAC address as part of a lease record in the DHCP server;

computer readable program code to receive a request from a remote device for the MAC address of the cable modem based on the Internet protocol (IP) address of the client computer for transmitting packets to the client computer;

computer readable program code to query the DHCP server to obtain the MAC address of the cable modem corresponding to the IP address of the client computer; and computer readable program code to transmit the MAC address to the remote device.

10. The computer program product of claim 9 wherein the computer readable program code to append to at least one of one or more messages comprises:

computer readable program code to receive one or more messages from a client computer;

computer readable program code to determine the MAC address of the cable modem that is coupled to the client computer responsive to receiving the one or more messages;

computer readable program code to append the MAC address of the cable modem to at least one of the one or more messages;

computer readable program code to transmit the one or more messages to the DHCP server.

11. The computer program product of claim 9 wherein the one or more messages comprise one or more DHCP messages.

12. A system comprising:

a server containing a table to include one or more lease records;

a client computer coupled to a communication medium through a modem, said client computer transmitting and receiving messages to and from the server; and a cable modem termination system (CMTS) coupled between the client computer and the server, the CMTS to append to the at least one of the one or more messages transmitted to the server a media access control (MAC) address of the modem for storing the MAC address as part of a lease record in the server, the CMTS to query the server to obtain the MAC address of the modem in response to receiving a request from a remote device for the MAC address based on an Internet protocol (IP) address of the client computer for transmitting the MAC address to the remote device.

13. The system of claim 12 wherein the one or more messages include one or more of the following: a discover packet and a request packet.

14. The system of claim 12 where the server comprises a dynamic host configuration protocol (DHCP) server, and the messages are DHCP messages.

15. The system of claim 14 where the modem comprises a cable modem and the communication medium comprises a cable plant where data is transmitted and received in time slots.

16. The system of claim 12 wherein the remote device comprises a router.

17. A cable modem termination system (CMTS) for message tagging in a system including a server and one or more client computers, comprising:

means for tagging one or more messages from a client computer to the server with a media access control (MAC) address of a cable modem that is attached to the client computer for storing the MAC address as part of a lease record in the server;

means for receiving a request for the MAC address of the cable modem based on the Internet protocol (IP) address of the client computer from a remote device for transmitting packets to the client computer;

means for obtaining the MAC address of the cable modem corresponding to the IP address of the client computer from the server if a forwarding table of the CMTS fails to contain the MAC address; and means for transmitting the MAC address to the remote device.

18. The cable modem termination system (CMTS) of claim 17 wherein said means for tagging comprises means for appending the MAC address of a cable modem that is attached to the client computer to dynamic host configuration protocol (DHCP) messages transmitted from the client computer to the server.

19. The cable modem termination system (CMTS) of claim 18 wherein the one or more DHCP messages include one or more of the following: a discover packet and a request packet.

20. The cable modem termination system (CMTS) of claim 17 further comprising:

means for receiving one or more messages from a client computer;

means for determining the MAC address of the cable modem that is coupled to the client computer responsive to means for receiving the one or more messages;

means for appending the MAC address of the cable modem to at least one of the one or more messages; and means for transmitting the one or more messages to the server.

21. The cable modem termination system (CMTS) of claim 20 wherein said means for determining comprises one of the following: means for determining the time slot that a message is received from the client computer and means for interrogating a header of the one or more messages.

22. The cable modem termination system (CMTS) of claim 17 wherein the device comprises a cable modem termination system, and the server comprises a dynamic host configuration protocol (DHCP) server.

23. The cable modem termination system (CMTS) of claim 17 wherein the remote device comprises a router.

24. A method for message tagging by a cable modem termination system (CMTS), comprising:

tagging one or more messages from a client computer to a server with a media access control (MAC) address of a cable modem that is attached to the client computer for storing the MAC address as part of a lease record in the server;

receiving a request by the CMTS for the MAC address of the cable modem based on the Internet protocol (IP) address of the client computer from a remote device for transmitting packets to the client computer;

obtaining the MAC address of the cable modem corresponding to the IP address of the client computer from the server if a forwarding table of the CMTS fails to contain the MAC address; and transmitting the MAC address to the remote device.

* * * * *